May 9, 1967 S. GARBERI ETAL 3,318,520
PROGRAM CONTROL DEVICE FOR AN ADDING OR ACCOUNTING MACHINE
Filed April 5, 1965 2 Sheets-Sheet 1
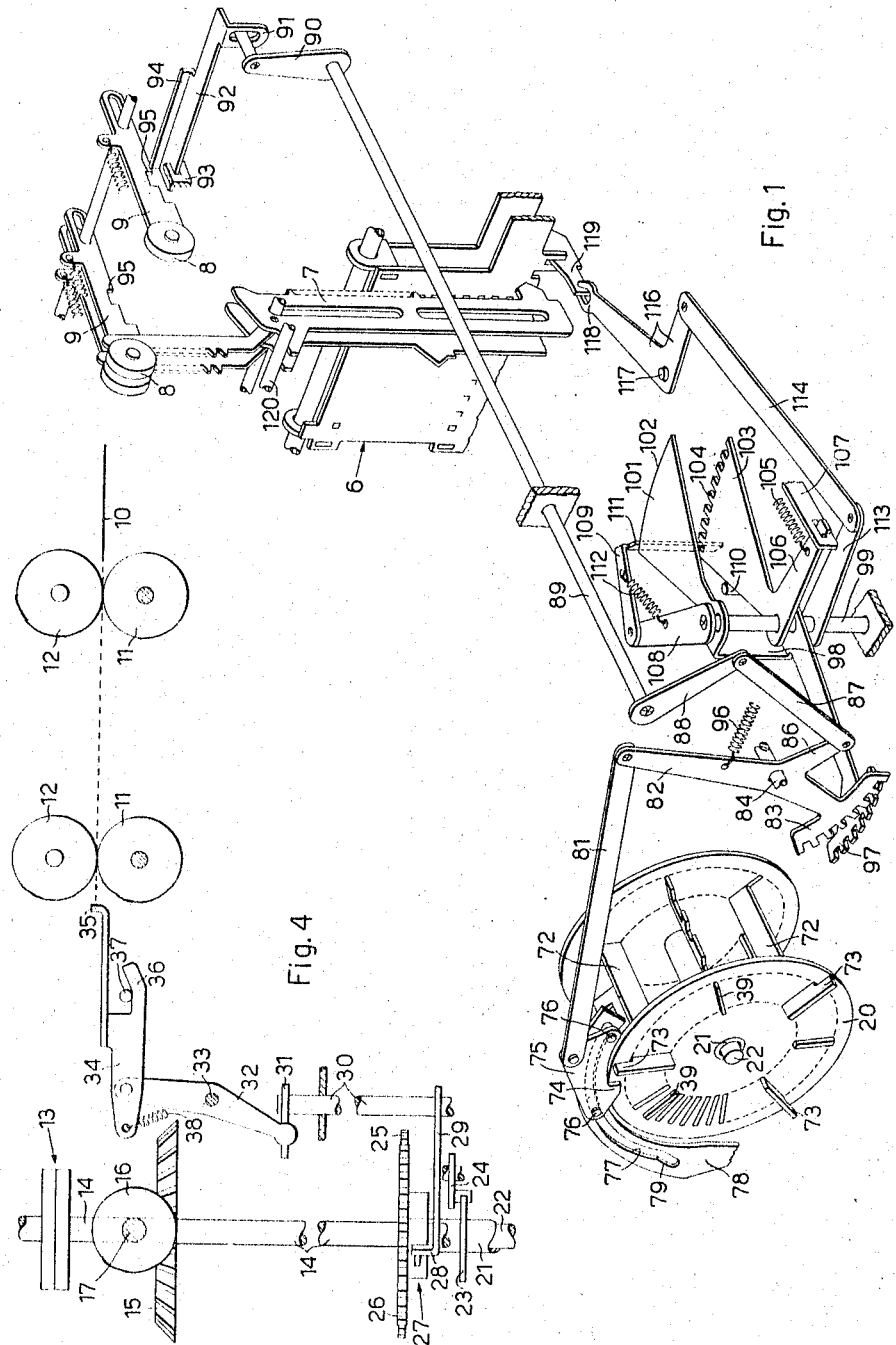
INVENTOR.
SERGIO GARBERI
GIUSEPPE RICCIARDI
BY John Toggenburger
AGENT May 9, 1967 S. GARBERI ETAL 3,318,520
PROGRAM CONTROL DEVICE FOR AN ADDING OR ACCOUNTING MACHINE
Filed April 5, 1965 2 Sheets-Sheet 2
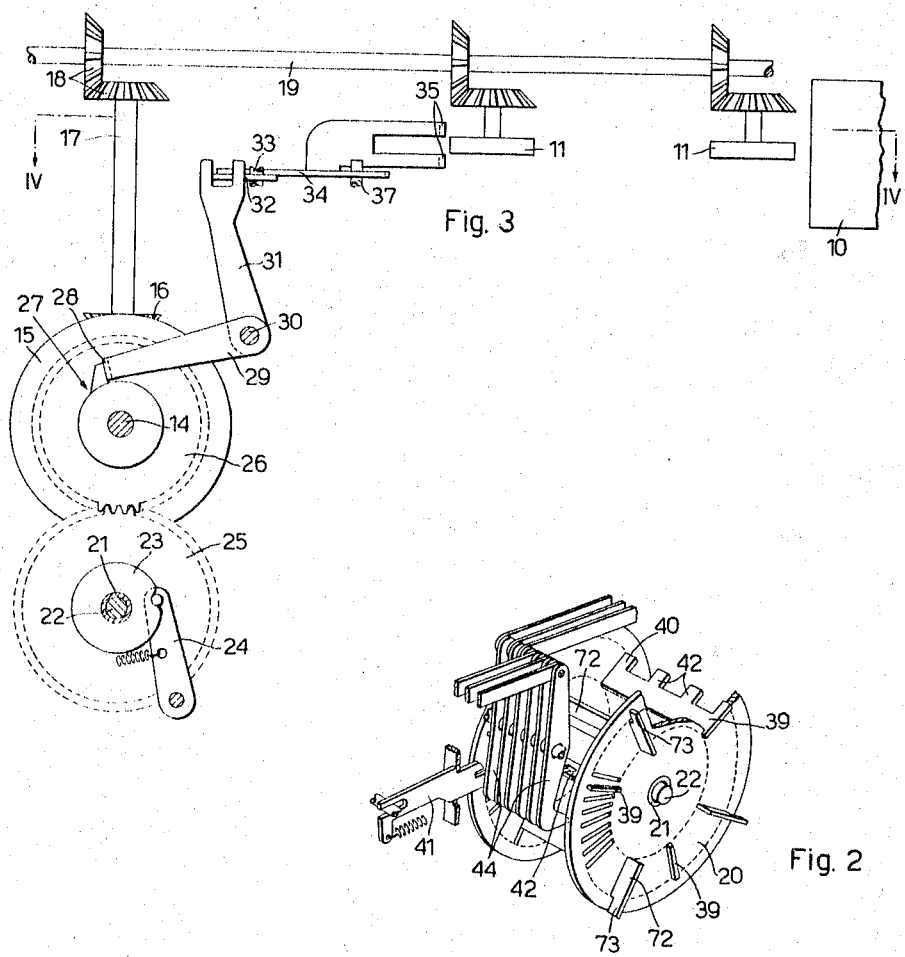
INVENTOR.
SERGIO GARBERI
GIUSEPPE RICCIARDI
BY John Taggenburger
AGENT United States Patent Office 3,318,520
Patented May 9, 1967

3,318,520
PROGRAM CONTROL DEVICE FOR AN ADDING
OR ACCOUNTING MACHINE
Sergio Garberi and Giuseppe Ricciardi, Ivrea, Italy, assignors to Ing. C. Olivetti & C., S.p.A., Ivrea, Italy
Filed Apr. 5, 1965, Ser. No. 445,656
Claims priority, application Italy, Apr. 11, 1964,
8,358/64
5 Claims. (Cl. 235—60.47)

This invention relates to a program control device for an adding or accounting machine, having a movable support adapted to be sequentially arrested in a set of different stations, a group of elements associated with each one of said stations and secured to said support, means adapted to cooperate with said elements upon arresting said support in the associated station, and a differentially settable function control member.

In the known program control devices, usually when a function control member is to be differentially set in a predetermined station of the program, the support is provided in said station with an element having a corresponding length. In the case the function control member is to be set through very long and different strokes, these program devices require additional means for enlarging the displacement controlled by said elements. These enlarging means make the device intricate and subject to misoperations.

These disadvantages are obviated by the program control device according to the invention, which is characterized by an additional element associated with each one of said stations and secured to said support at a variable distance with respect to the associated station, means being provided for cooperating with said additional element during the movement of said support from a station to another station and for setting said function control member according to said distance.

This and other characteristics of the invention will become apparent from the following detailed description of a preferred embodiment thereof and from the accompanying drawings, wherein:

FIG. 1 is a partial perspective view taken from the rear and the left side of an adding machine embodying a program control device according to the invention, FIG. 2 is a perspective view of a detail of FIG. 1 taken from the rear and the right side of the machine, FIG. 3 is a partial rear view of the machine, FIG. 4 is a partial plan view taken according to the line IV—IV of FIG. 3.

With reference to FIG. 1, the numeral 6 indicates an amount set up mechanism formed of a conventional pin carriage and comprised in a ten key printing adding machine. The pin carriage 6 (FIG. 1) is transversely movable step by step leftwards (rightwards in FIG. 1) upon setting up each order of the carriage 6. The adding machine comprises also a plurality of amount printing members or typewheels 8 each one carried by a corresponding slide 9 and adapted to be variably predisposed by an actuator 7 cooperating with the carriage 6 in a known manner.

The adding machine is adapted to print on documents, for example checks 10 (FIGS. 3 and 4), with characters adapted to be automatically recognized, for example magnetic characters. Usually various data, for example the accounting number, the amount etc., are to be printed on each document according to a predetermined program. In order to prevent errors said program controls the number of orders to be printed for each data, independently of the number of significant orders.

Each document 10 is transversely fed from left to right in front of the typewheels 8 (FIG. 1) by two pairs of rollers 11 and 12 (FIG. 4). The rollers 11 are continuously rotated by an electric motor not shown in the drawings through a friction joint 13, a horizontal shaft 14, a first pair of bevel gears 15, 16, a vertical shaft 17 (FIG. 3), a second pair of similar bevel gears 18 and a transverse shaft 19, whereas the rollers 12 are spring urged to contact the corresponding rollers 11 in a manner known per sé.

The adding machine is also provided with a program control device comprising a drum 20 (FIG. 1) secured to a sleeve 21 rotatably mounted on a stationary pivot 22. Secured to the sleeve 21 is also a cam 23 (FIG. 3) cooperating with a spring urged locking lever 24, and a toothed wheel 25 engaging a pinion 26 rockably mounted on the shaft 14. The pinion 26 is adapted to be rotated by the shaft 14 synchronously with the rollers 11 through a clutch generically indicated by the numeral 27. The clutch 27 is normally held disengaged by a lug 28 of an arm 29 secured to a shaft 30 rockably mounted on the machine frame. Another arm 31 secured to the shaft 30 is connected to a horizontal lever 32 (FIG. 4) pivoted at 33. Pivotally mounted on the lever 32 is a pawl 34 having a projection 36 normally urged by a spring 38 to contact a stationary pin 37. The pawl 34 is provided with a pair of lugs 35 (FIG. 3) normally located on the path of the document 10.

Removably secured to the drum 20 (FIG. 2) is a plurality of stop plates 39 each one determining a corresponding station of the program. Each stop plate 39 is provided with a projection 40 adapted to cooperate with a counterstop 41 in the manner described in the United States Letters Patent No. 3,121,487 in order to sequentially stop the drum 20 in the corresponding station. A group of elements or projections 42 is associated with each one of said stations and is integral with each plate 39. The projections 42 are adapted to cooperate with a set of corresponding levers 44 for controlling the various machine functions.

Secured to the drum 20 is also a plurality of additional elements or plates 72 each one associated with a corresponding station, and therefore with a corresponding stop 39. Each plate 72 is variably distanced clockwise with respect to the associated stop plate 39 and is provided with a projection 73 adapted to engage a shoulder 74 (FIG. 1) of a slide 75 when the drum 20 is displaced from a station to the station associated with this plate 72. The slide 75 is provided with a pair of pins 76 slidably mounted on a circular slot 77 of a stationary plate 78. An end 79 of the slot 77 is cam shaped for causing the slide 75 to bring the shoulder 74 out of the path of the projections 73.

The slide 75 is connected through a link 81 to a differentially settable function control member formed of a lever 82 fulcrumed on a pivot 84. A projection 86 of the lever 82 is connected through a link 87 to an arm 88 secured to a shaft 89 rotatably mounted on the machine frame. Another arm 90 secured to the shaft 89 is pin and slot connected with a lug 91 of a plate 92 transversely slidable on a portion 93 of the machine frame. The plate 92 is provided with a bent edge 94 adapted to cooperate with a shoulder 95 of each slide 9. A spring 96 connected to the lever 82 normally holds the shoulder 74 in the rest position of FIG. 1 and the plate 92 at left of the slide 9 of the highest order, whereby normally all the typewheels 8 are conditioned for printing. The rest position of the shoulder 74 is distanced from the counterstop 41 (FIG. 2) proportionally to the plurality of typewheels 8 (FIG. 1), whereas each plate 72 is distanced from the associated stop 39 proportionally to the number of orders to be printed in each station. The lever 82 is also provided with a toothed sector 83 engaging a horizontal toothed sector 97 provided on a bail 98 rotatably mounted on a vertical shaft 99. The bail 98 is also provided with an intermediate member or sector 101 having a smooth edge 102 having a length proportional to the distance between the two extreme typewheels 8. In other words the length of the edge 102 is proportional to the plurality of typewheels 8 and therefore to the number of orders of the pin carriage 6. Fulcrumed on the shaft 99 is also a locking member or sector 103 conditionable for locking the machine. The sector 103 is provided with a toothed edge 104 as long as and parallel to the smooth edge 102 of the sector 101.

The sector 103 is integral with an arm 106 engaging a member 107, which when displaced rearwards is adapted to lock all the motor keys of the machine, but the conventional set up clear key. A spring 105 normally urges the sector 103 to contact a stationary stop member 110.

The shaft 99 is rotatably mounted on the machine frame and is secured to an arm 108 pivotally mounting a pawl 109. This latter is provided with an element or lug 111 normally urged by a spring 112 to contact the smooth edge 102 and adapted to engage the toothed edge 104. Secured on the shaft 99 is also an arm 113 connected through a link 114 to a lever 116 fulcrumed at 117. A forked arm 118 of the lever 116 engages a projection 119 of the pin carriage 6.

The program control devices operates as follows:

Normally, when the machine is operating, the shaft 14 (FIG. 3) is continuously rotated clockwise by the electric motor through the friction joint 13 (FIG. 4). Furthermore, the shaft 14, through the bevel gears 15, 16, rotates the shaft 17 counterclockwise. The shaft 17, through the bevel gears 18 (FIG. 3) and the shaft 19, continuously rotates the rollers 11 (FIG. 4) counterclockwise. The lug 28 (FIG. 3) of the arm 29 holds the clutch 27 disengaged, whereby the pinion 26, the locking lever 24 by engaging the cam 23 holds the wheel 25 and the drum 20 in the rest position. In this rest position the first stop plate 39 (FIG. 2) is distanced three steps from the counterstop 41.

When a document 10 (FIG. 4) is inserted between the rollers 11 and 12 from left (from right in FIG. 4), the document is advanced until encountering the lugs 35 of the pawl 34. This latter is now displaced rightwards and on one hand it is caused by the projection 36 to disengage the lugs 35 from the document 10, on the other hand it rocks the lever 32 counterclockwise. In turn the lever 32 rocks the arm 31 (FIG. 3) clockwise together with the arm 29, whereby the lug 28 caused the clutch 27 to be engaged. The clutch 27 causes now the pinion 26 to be rocked clockwise by the shaft 14 and to rock counterclockwise the wheel 25 together with the drum 20 (FIG. 2), which is thus synchronously rotated with at rollers 11.

Now, when the projection 40 of the first stop plate 39 encounters the counterstop 41, the drum 20 is arrested in the first station. Since the clutch 27 is now engaged, the friction joint 13 causes the shaft 14 and the rollers 11 to be arrested as well, while the electric motor continues its rotation. The document 10 is thus arrested in such a position corresponding to the first datum to be printed, while the projections 42 of the first stop plate 39 operate the levers 44 to control the required machine functions in a known manner.

During the movement of the drum 20 to the first station the projection 73 of the plate 72 associated with the first stop plate 39 engages the shoulder 74 (FIG. 1), whereby the slide 75 is moved along the slot 77 a stroke proportional to the number of orders which are not to be printed. The link 81 rocks now the lever 82 counterclockwise, whereby the link 87 rocks the arm 88 counterclockwise together with the shaft 89 and the arm 90, thus displacing the plate 92 rightwards to bring the bent edge 94 into the paths of the shoulders 95 of the slides 9 corresponding to typewheels 8 to be prevented from printing. Furthermore, the lever 82, through the sectors 83 and 97, rocks the sector 101 counterclockwise an angle proportional to the above number of orders.

Now, the first datum to be printed on the document 10 is set up on the pin carriage 6 through the conventional ten key keyboard not shown in the drawings. The pin carriage 6 is thus displaced step by step leftwards (rightwards in FIG. 1) and, through the lever 116 and the link 114 rocks the arm 113 clockwise together with the shaft 99 and the arm 108. This latter displaces thus the pawl 109 clockwise, whereby the lug 111 slides on the edge 102 of the sector 101 as long as the number of orders set upon on the pin carriage 6 is less than the number of orders to be printed as predetermined by the projection 73.

When the number of the set up orders becomes equal to that of the orders to be printed, the lug 111 overcomes the straight edge 102, whereby the spring 112 causes the lug 111 to engage one of the teeth of the toothed edge 104. Now, if another order is erroneously set up on the pin carriage 6, the lug 112 rocks the sector 103 clockwise and displaces the member 107 rearwards. The member 107 locks thus all the motor keys, whereby the incorrect datum will not be printed on the document. However, the pin carriage 6 may be restored rightwards through the clear key in a known manner.

On the contrary, if the number of set up orders is less than the number of orders to be printed, the lug 111 does not affect the sector 103. By depressing now the required motor key, a machine cycle is started. During this cycle a conventional universal bar 120 is displaced upwards in a known manner, thus causing the actuators 7 to be differentially moved upwards and to rock the typewheels 8 according to the set up datum. Simultaneously the slides 9 are released in a known manner by a second universal bar not shown in the drawings, whereby the slides 9 at left of the right end of the bent edge 94 are arrested, while the slides 9 at right thereof cause the corresponding wheels 8 to print on the document 10 the set up datum together with a number of non-significant zeroes to reach the number of printed orders required by the program.

Thereafter the slides 9 and the actuators 7 are restored, while the counterstop 41 (FIG. 2) releases the projection 40 of the first stop plate 39. Now the friction joint 13 (FIG. 4) rotates again synchronously the drum 20 and the rollers 11. The rollers 11 advance the document 10 to predispose same for being printed with a second datum. The drum 20 through the projection 73 temporarily displaces the slide 75 additionally rightward until one of the pins 76 engages the end 79 of the slot 77, thus disengaging the shoulder 74 from said projection 73. Now the spring 96 restores the lever 82 together with the slide 75 to the position of FIG. 1. Then the projection 73 of the plate 72 associated with the second stop plate 39 engages the shoulder 74 and displaces same until said second stop plate 39 is arrested by the counterstop 41, thus predisposing the lever 82 according to the number of orders required for the second datum.

The second and the following data will be printed on the document 10 in a manner similar to the above described first datum. After having printed the last datum the drum 20 is again rotated counterclockwise and upon completing one revolution is arrested by the lug 28 (FIG. 3) of the arm 29 which disengages the clutch 27. The drum 20 is now locked by the lever 24 through the cam 23, while the rollers 11 are again continuously rotated, thus ejecting the document 10 rightwards.

It is thus clear that the additional elements 72 are secured to the support 20 at a variable distance with respect to the associated stop plates 39 and that the means 74 are engaged by said additional elements 72 during the movement of the support from a station to another station for setting the function control member 82 according to said distance.

It is intended that various modifications, improvements and additions of parts may be made to the described program control device without departing from the scope thereof.

What we claim is:

1. In an adding or accounting machine comprising a program control device having a movable support adapted to be sequentially arrested in a set of different stations, a group of elements associated with each one of said stations and secured to said support, means adapted to cooperate with said elements upon arresting said support in the associated station, and a differentially settable function control member, the combination comprising:
    (a) an additional element associated with each one of said stations and secured to said support at a variable distance with respect to the associated group of elements,
    (b) and means adapted to be engaged by said additional element during the movement of said support from a station to another station for setting said function control member according to said distance.

2. In an adding or accounting machine comprising a plurality of amount printing members conditionable for printing, a program control device having a movable support adapted to be sequentially arrested in a set of stations, a group of elements associated with each one of said stations and secured to said support, means adapted to cooperate with said elements upon arresting said support in the associated station, and a differentially settable function control member, the combination comprising:
    (a) an additional element associated with each one of said stations and secured to said support at a variable distance with respect to the associated group of elements,
    (b) means adapted to be engaged by said additional element during the movement of said support from a stations to another stations for setting said function control member according to said distance,
    (c) and a transversely movable member connected to said function control member for conditioning a number of said printing members corresponding to said distance.

3. In an adding or accounting machine comprising an amount set up mechanism transversely movable step by step, a plurality of amount printing members conditionable for printing, a program control device having a movable support adapted to be sequentially arrested in a set of stations, a group of elements associated with each one of said stations and secured to said support, means adapted to cooperate with said elements upon arresting said support in the associated stations, and a differentially settable function control member, the combination comprising:
    (a) an additional element associated with each one of said stations and secured to said support at a variable distance with respect to the associated group of elements,
    (b) means adapted to be engaged by said additional element during the movement of said support from a station to another station for setting said function control member according to said distance,
    (c) a transversely movable member connected to said function control member for conditioning a number of said printing members corresponding to said distance,
    (d) and means controlled by said function control member and by said mechanism to prevent said mechanism from setting up more than a number of orders equal to said number of printing members.

4. In an adding or accounting machine comprising an amount set up mechanism transversely movable step by step, a plurality of amount printing members conditionable for printing, a program control device having a movable support adapted to be sequentially arrested in a set of stations, and a differentially settable function control member, the combination comprising:
    (a) an element associated with each one of said stations and secured to said support at a variable distance with respect to the associated station,
    (b) means adapted to be engaged by said element during the movement of said support from a station to another station for setting said function control member according to said distance,
    (c) a transversely movable member connected to said function conditioning control member for conditioning a number of said printing members corresponding to said distance,
    (d) an intermediate member connected to said function control member and having a smooth edge having a length proportional to said plurality,
    (e) a locking member conditionable for locking said machine and having a toothed edge as long as and parallel to said straight edge,
    (f) a sliding element connected to said mechanism and normally adapted to slide on said smooth edge,
    (g) and means for causing said sliding element to engage said toothed edge for conditioning said locking member when a number of orders higher than said number of printing members has been set up on said mechanism.

5. In an adding or accounting machine comprising a plurality of amount printing members conditionable for printing, a program control device having a rotatable drum, and a counterstop adapted to sequentially arrest said drum in a set of different stations, the combination comprising:
    (a) a rotatable shaft,
    (b) a friction joint for yieldably rotating said shaft,
    (c) feeding rollers rotatable for feeding a document to different columnar positions with respect to said printing members,
    (d) gear means for causing said shaft to rotate said rollers,
    (e) a normally disengaged one cycle clutch between said shaft and said drum,
    (f) and means operable for engaging said clutch to rotate said drum from a station to a next following one synchronously with the feeding operation of said rollers on said document from a columnar position to the next following one, said friction joint being adapted to permit said counterstop to arrest said drum and said rollers despite the engagement of said clutch.

References Cited by the Examiner

UNITED STATES PATENTS

| | | | |
|---|---|---|---|
| 1,286,186 | 11/1918 | Miller | 197—84 |
| 2,229,763 | 1/1941 | Muller | 235—60.42 |
| 2,755,019 | 7/1956 | Bringer et al. | 235—60.42 |
| 3,018,870 | 1/1962 | Lambert et al. | 197—84 |
| 3,045,798 | 7/1962 | Lambert et al. | 197—84 |

FOREIGN PATENTS 1,342,588  9/1963  France

RICHARD B. WILKINSON, *Primary Examiner.*

STEPHEN J. TOMSKY, STANLEY A. WAL,
*Assistant Examiners.*